United States Patent

Simmons

Patent Number: 6,088,946
Date of Patent: Jul. 18, 2000

[54] FISHING POLE HOLDER AND FISH HOOKER

[76] Inventor: Robby Allan Simmons, 1097 N. State St., Space #210, Hemet, Calif. 92543

[21] Appl. No.: 09/285,851

[22] Filed: Apr. 5, 1999

[51] Int. Cl.[7] .................................................. A01K 97/11
[52] U.S. Cl. ................................. 43/15; 43/21.2; 248/535
[58] Field of Search .............................. 43/15, 16, 21.2, 43/25; 248/534, 535, 536, 538, 539, 231.81

[56] References Cited

U.S. PATENT DOCUMENTS

| | | |
|---|---|---|
| D. 219,971 | 2/1971 | Bennett et al. ........................ D22/22 |
| D. 347,678 | 6/1994 | McCann, Jr. et al. ................. D22/148 |
| 374,737 | 12/1887 | Geils . |
| 693,071 | 2/1902 | Ruud . |
| 834,414 | 10/1906 | Schmidt, Jr. . |
| 1,488,838 | 4/1924 | Savoie . |
| 1,856,477 | 5/1932 | Gerline . |
| 1,859,944 | 5/1932 | Waitt . |
| 1,957,853 | 5/1934 | Sibley ..................................... 43/15 |
| 2,283,092 | 5/1942 | Rosen . |
| 2,494,800 | 1/1950 | Finley ..................................... 43/15 |
| 2,551,996 | 5/1951 | Cherubini ............................... 43/15 |
| 2,642,690 | 6/1953 | Soenksen ................................ 43/15 |
| 2,657,492 | 11/1953 | Skorr ...................................... 43/15 |
| 2,703,465 | 3/1955 | Stefano ................................... 43/15 |
| 2,744,351 | 5/1956 | Smith ...................................... 43/16 |
| 2,770,906 | 11/1956 | Hood ...................................... 43/16 |
| 2,781,600 | 2/1957 | McDonnell ............................. 43/15 |
| 2,783,575 | 3/1957 | Housel, Sr. ............................. 43/16 |
| 2,784,517 | 3/1957 | Mooney .................................. 43/16 |
| 2,804,277 | 8/1957 | Kinder .................................... 248/42 |
| 2,811,801 | 11/1957 | Daniel .................................... 43/15 |
| 2,821,041 | 1/1958 | Hughes ................................... 43/16 |
| 2,835,065 | 5/1958 | Schwartzkopf ......................... 43/15 |
| 2,843,962 | 7/1958 | Porter ..................................... 43/15 |
| 2,908,099 | 10/1959 | Burke . |
| 3,055,136 | 9/1962 | Scott et al. .............................. 43/15 |
| 3,162,970 | 12/1964 | Gould . |
| 3,284,943 | 11/1966 | Wedel ..................................... 43/15 |
| 3,412,499 | 11/1968 | Pastrovich, Sr. ........................ 43/15 |
| 3,601,919 | 8/1971 | Nixon . |
| 3,834,055 | 9/1974 | Bianco .................................... 43/15 |
| 3,837,109 | 9/1974 | DeJulio ................................... 43/15 |
| 3,874,105 | 4/1975 | Andree et al. .......................... 43/15 |
| 3,881,269 | 5/1975 | Timmons ................................ 43/15 |
| 3,897,646 | 8/1975 | Sheets ..................................... 43/15 |
| 4,188,742 | 2/1980 | Oulman ................................... 43/15 |
| 4,676,018 | 6/1987 | Kimball .................................. 43/15 |
| 5,245,778 | 9/1993 | Gallegos et al. ........................ 43/15 |
| 5,359,802 | 11/1994 | Gutierrez ................................ 43/16 |
| 5,365,689 | 11/1994 | Holliman ................................ 43/21.2 |
| 5,560,137 | 10/1996 | Herring ................................... 43/21.2 |

*Primary Examiner*—Jack W. Lavinder
*Attorney, Agent, or Firm*—Calif Tervo

[57] ABSTRACT

A fishing pole holder and fish hooker (10) generally comprises a sleeve (20) for holding a fishing pole (100), a pivot (70) pivotally attaching sleeve (20) to a base (30), a biasing assembly (80), a latch (90), a tether (75) for retaining pole (100) in sleeve (20) and a support (40). The biasing assembly (80) includes a plurality of attachment points (89) for spring (81) to adjust spring bias to compensate for different pole weights. A plurality of supports (45,55,60,64) simultaneously attach to base (30) so as to be conveniently available for any fishing environment.

4 Claims, 2 Drawing Sheets

FISHING POLE HOLDER AND FISH HOOKER

BACKGROUND OF THE INVENTION

1. Field of the Invention

This invention relates in general to fishing pole holders that automatically hook a fish, and more specifically to one including a plurality of supports.

2. Background of the Invention

Fishing rod holders that spring upward upon the fish taking the bait are shown in the prior art. However, conventional holders have various limitations and drawbacks such that there has been a need for improvements. For example, there has been a need for a simple method of adjusting for various pole weights. Also, there has been a need for a simple method of retaining a pole to the holder. Additionally, conventional pole holders are designed to be supports for use in a specific fishing environment. Holders designed to be used on a boat may not be suitable for use on a soil shoreline, or on a jetty or on ice. Therefore, there has been a need for a holder that can be used in a variety of fishing environments.

SUMMARY OF THE INVENTION

This invention is a fishing pole holder and fish hooker and it generally comprises a sleeve for holding a fishing pole, a pivot pivotally attaching the sleeve to a base, a spring biasing assembly, a latch, a tether for retaining a fishing pole in the sleeve and a plurality of supports for the holder.

In an exemplary embodiment, the spring biasing assembly includes a plurality of spring attachment points to change spring bias to compensate for different pole weights.

A plurality of supports for the holder simultaneously attach to the base so as to be conveniently available for any fishing environment.

Other features and many attendant advantages of the invention will become more apparent upon a reading of the following detailed description together with the drawings in which like reference numerals refer to like parts throughout.

DETAILED DESCRIPTION OF INVENTION

Figures 1, 3:
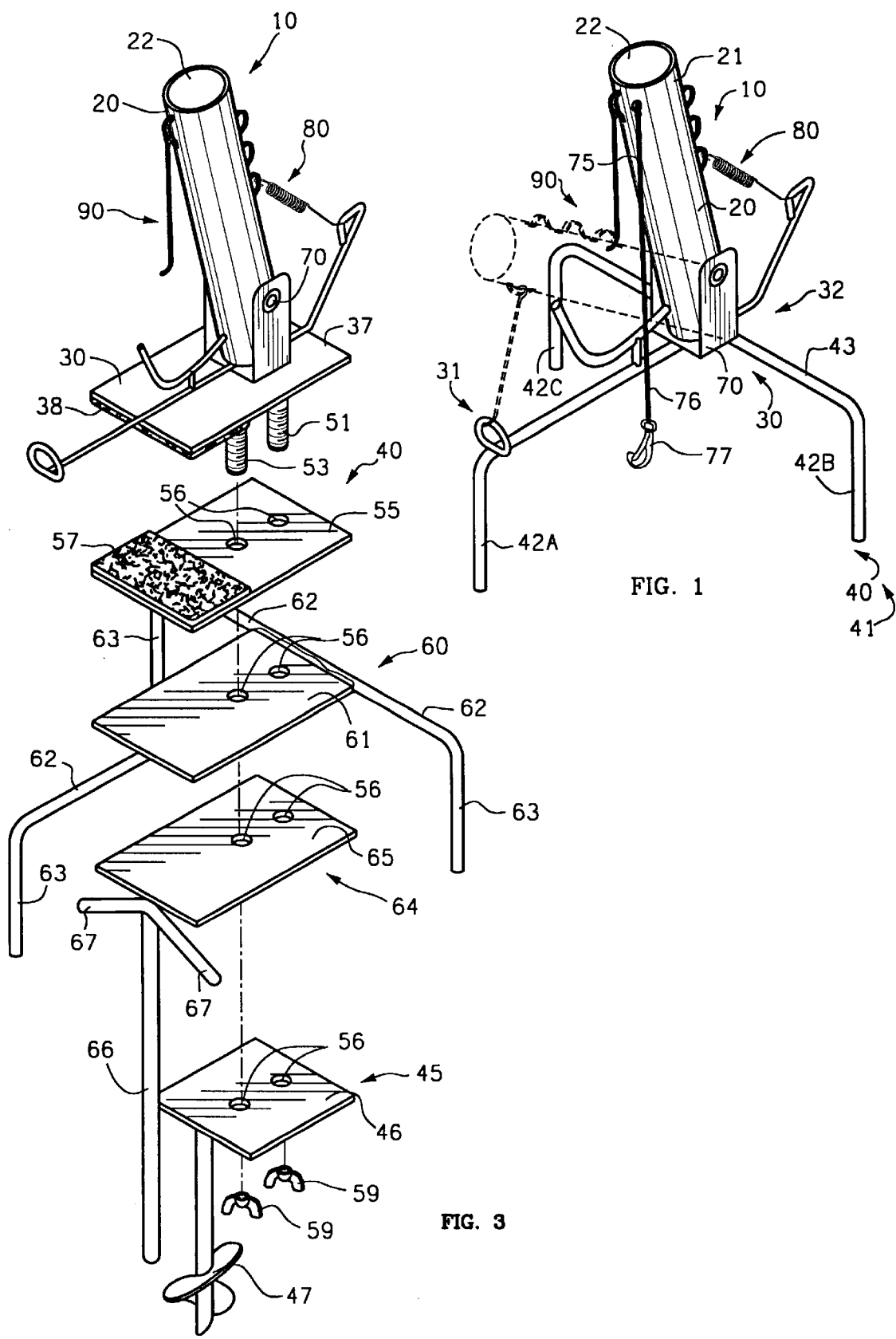
FIG. 1 is a perspective view of a first preferred embodiment of the pole holder of the invention shown in solid in an upright position and in phantom in a latched position.
FIG. 3 is an exploded perspective view of a third embodiment incorporating a plurality of supports.
Figure 2:
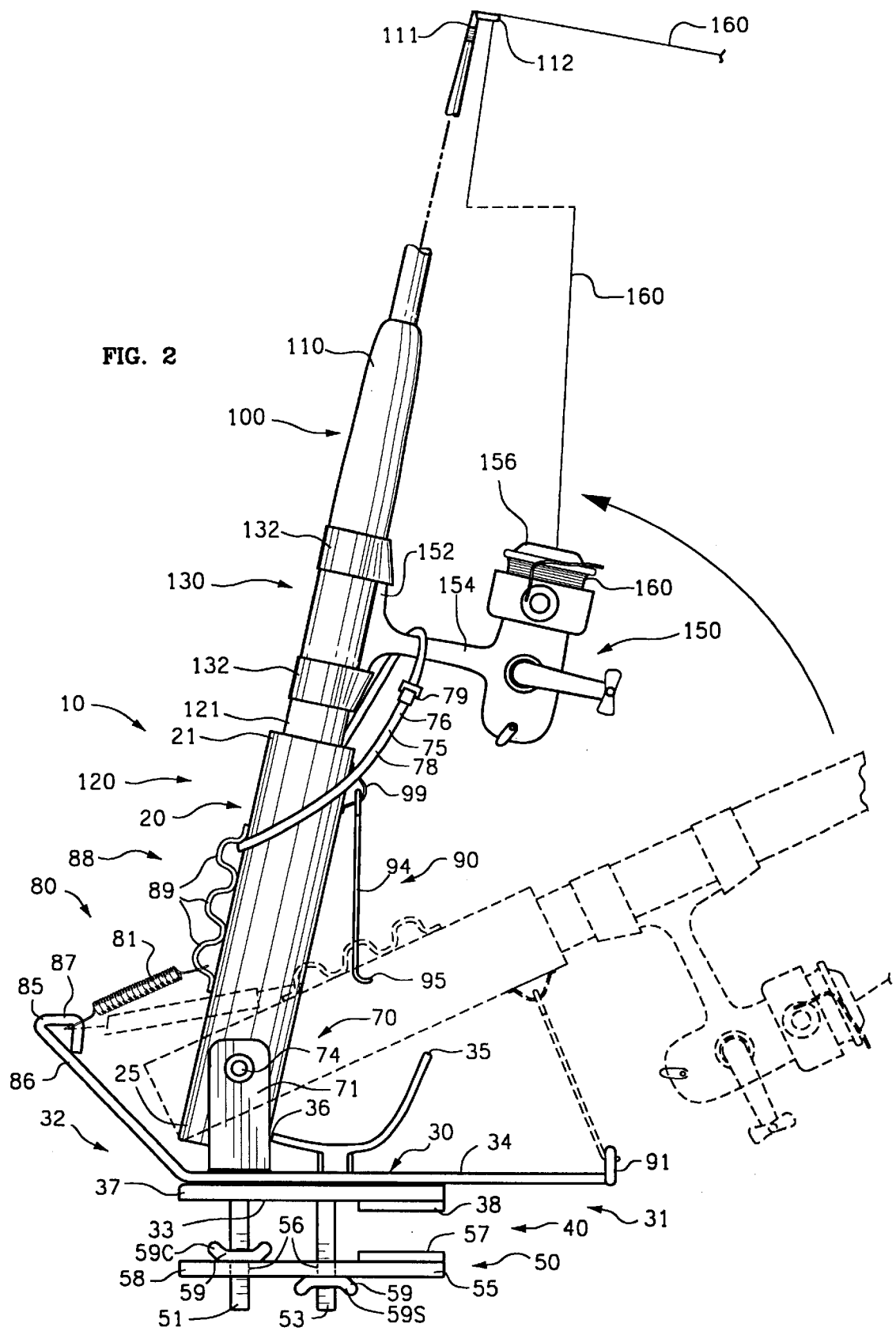
FIG. 2 is a fragmented left side elevation view of a second embodiment of the pole holder shown holding a pole.

With reference now to the drawings, FIG. 1 is a perspective view of a first preferred embodiment of the pole holder 10 of the invention shown in solid in an upright position and in phantom in a latched position, and FIG. 2 is a fragmented left side elevation view of a second embodiment of holder 10 holding a fishing pole 100. Pole holder 10 generally includes a sleeve 20 for holding pole 100, a base 30, a pivot 70, a spring assembly 80 a latch 90, a tether 76, and a support 40.

Fishing pole 100, shown partially cut away, is a common representative including an elongate rod 110 having a distal end 111 including an eye 112, a proximal end 120, and a central section 130 therebetween. Proximal end 120, shown, includes a substantially cylindrical handle 121. A reel 150 includes a foot 152, a stand off 154 and a spool 156 wound with fishing line 160. Foot 152 is attached, such as by screw sleeves 132 to rod 110 central of proximal end 120.

Sleeve 20, shown, is a cylindrical pipe having an upper orifice 22 adapted for receiving proximal end 120 of rod 110 and includes a top end 21 and a bottom end 25. Many other configurations of sleeve 20, such as known in the art, could be used to hold pole 100 according to the invention.

Base 30 has a front 31, a rear 32, a bottom 33 and a top 34. Pivot 70 pivotally mounts sleeve 20 to base 30 such that sleeve 20 swings vertically between a downward stop position, as will be described later, and an upright stop position, as depicted in solid lines in the figures. Pivot 70 includes a bracket 71 having a lower end connected to base 30 and an upper end supporting means, such as a pivot pin 74, for pivotally supporting sleeve 20 about a horizontal pivot axis at a distance from bottom end 25. Base 30 further includes a downward stop 35 for stopping pivoting of sleeve 20 at the downward stop position and an upright stop 36 for stopping pivoting of sleeve 20 at the upright stop position.

Spring assembly 80, connected between base 30 and sleeve 20, upwardly biases sleeve 20 toward the upright stop position. Spring assembly 80 includes an elastic tension member, such as spring 81, and attachment or anchor means, such as base anchor 85, and sleeve anchor 88, for connecting spring 81 to base 30 and sleeve 20 respectively. At least one anchor, such as sleeve anchor 88, includes a plurality of spring connecting points, such as multiple eyes 89, positioned along sleeve 20 so as to change the bias provided by spring 81 depending upon to which eye 89 it is attached. In this manner, the biasing force can be set to compensate for the weight of pole 100. Spring 81 includes means, such as a hook, on at least one end for easily and selectably connecting spring 81 to any of the plurality of eyes 89 on sleeve 20. Preferably, base anchor 85 includes an upright 86 connected to rear 32 of base 30 and terminating with an eye 87 at a height above pivot axis pin 74 such that spring 81 does not contact sleeve 20 in the latched position as shown in phantom so that pivoting does not interfere with the biasing.

Latch 90 includes a first element, such as eye 91, connected to base 30 and a second element, including a pivoting member, such as a swing arm 94, pivotally connected to eye 99 which in turn is connected to sleeve 20. Swing arm 94 includes a lower end including a latch hook 95 selectively engageable with eye 91 so as to be held, in the cocked or latched position shown in phantom, by the upward biasing of spring 81. The cocked position is intermediate the downward stop position and the upright stop position. Preferably, latch 90 is connected such that upon slight further downward movement of sleeve 20 from the latched position, such as resulting from a biting fish pulling down on fishing line 160, hook 95 disengages from eye 91, gravity swings arm 94 away, and spring 81 snaps sleeve 20 and pole 100 to the upright position, thus hooking the biting fish. The spring bias described above can be adjusted for each pole 100 for proper latch operation.

Tether 75 provides means for selectively retaining fishing rod 110 in sleeve 20 such that pole 100 is not lost in rough seas or pulled out by a large fish. FIG. 1 shows a first embodiment of tether 75 comprising a rope or cord 76 having a first end connected to sleeve 20 near top end 21 and a second end including a fastener, such as clip 77. To tether pole 100, clip 77 of FIG. 1 is either directly clipped to pole 100 or cord 76 is extended and wrapped around an element of pole 100, such as reel stand off 154, and clip 77 is clipped onto the extended cord 76. FIG. 2 shows a second embodiment of tether 75 being a belt 78 having closure means, such as snap buckle 79, shown, hoop/loop fastener material or a snap. Belt 78 is attached to holder 10, such as by being threaded through eye 89 and to pole 100, such as by going around reel stand off 154 as shown.

Various supports 40 for holder 10 may be attached to base 30. In FIG. 1, support 40 includes a tripod 41 comprising three downwardly protruding legs 42A,42B,42C. At least one leg, such as leg 42A is connected to front 31 of base 30. At least one leg, such as leg 42B, is connected to rear 32 of base 30 and is adapted, such as being sufficiently pointed, for driving into the ground so as to be a ground spike. A downward force may be exerted on horizontal section 43 by a person's foot or by a hammer or the like to drive legs 42B, 42C into the ground.

In FIG. 2, base 30 includes support attachment means for attaching a plurality of supports 40. FIG. 2 shows a preferred embodiment of a clamping support 50 such as for attachment to a dock, pier or side of a boat. Base 30 includes a top clamping plate 37 including a downward-facing clamping surface 38. Support 40 includes a clamp 50 which generally includes a distal threaded stud 51, a proximal threaded stud 53, a rigid bottom clamping plate 55, a pair of nuts, 59, such as wing nuts 59S,59C. Distal threaded stud 51 is attached to base 30 and protrudes downward distal from clamping surface 38 of base 30. Proximal threaded stud 53 is attached to base 30 and protrudes downward intermediate clamping surface 38 and distal stud 51. Bottom clamping plate 55 includes a pair of bores 56 therethrough for receiving studs 51,53, a top including a clamping surface 57 facing clamping surface 38 of base 30, and a bottom 58. Space adjusting nut 59S is threadably attached to proximal stud 53 for bearing against bottom 58 of bottom clamping plate 55 for adjusting the spacing of bottom clamping plate 55 from base 30 at proximal stud 53. Clamping nut 59C is threadably attached to distal stud 51 for bearing against the top of bottom clamping plate 55. Because it is desirable that clamp 50 be quickly attached and unattached, the thread on studs 51, 53 is course. The course thread reduces the clamping force. However, the reversed wing nuts 59S,59C provide greater clamping force than having both wing nuts on bottom 58. Spacing wing nut 59S is adjusted so clamping surfaces 37, 57 fit over the object to be clamped to. Then, clamping wing nut 59C is adjusted to clamping surfaces 38, 57 on the object. Spacing wing nut 59S acts as a pivot point so the mechanical advantage of clamp 50 is the ratio of the distance between threaded studs 51, 53 to the distance between proximal stud 53 and clamping surface 38.

FIG. 3 is an exploded perspective view of a third embodiment of holder 10 incorporating a plurality of supports 40. The upper portion of holder 10 is the same as in FIG. 2 in that base 30 includes a top clamping plate 37 having a clamping surface 38. Support attachment means includes threaded studs 51,53, and wing nuts 59. Bottom clamping plate 55 includes bo 56 for mounting on studs 51,53 and mating clamping surface 57.

A tripod support 60 includes a mounting pat 61 having bores 56 for mounting on studs 51, 53. Tripod mounting plate 61 includes horizontal extensions 62. Legs 63 project downward from horizontal extensions 62. Horizontal extensions 62 are accessible to the user to drive legs 63 into the ground as desired.

A jetty rod support 64 includes a mounting plate 65 having bores 56 for mounting on studs 51, 53, and an elongate vertical jetty rod 66 projecting downward therefrom. A plurality of outwardly extending stabilizing fingers 67 are attached to mounting plate 65 or, more preferably, toward the top of jetty rod 66. Jetty rod 66 is slipped down between large rocks until fingers 67 encounter the rocks.

An ice screw support 45 includes a mounting plate 46 having bores 56 for mounting on studs 51, 53, and a vertical ice screw 47 projecting downward therefrom for screwing into ice or other similar material for supporting holder 10.

Supports 45,55,60,64 are all simultaneously attachable to base 30 so as to be conveniently available for selection for supporting holder 10. Any support 45,55,60,64 which is unnecessary or in the way can be temporarily removed and set aside during use of the desired support and then can be reattached for storage.

In use, holder 10 is attached by a support 45,55,60,64 to the terrain, line 60 is cast and slack is retrieved, pole 100 is set in holder 10 and tethered, and latch 90 is set. Upon a fish strike, latch 90 disengages and pole 100 is jerked erect thereby setting the hook.

Having described the invention, it can be seen that it provides a very convenient device for holding fishing poles of various weights in various environments.

Although a particular embodiment of the invention has been illustrated and described, various changes may be made in the form, composition, construction, and arrangement of the parts without sacrificing any of its advantages. Therefore, it is to be understood that all matter herein is to be interpreted as illustrative and not in any limiting sense, and it is intended to cover in the appended claims such modifications as come within the true spirit and scope of the invention.

I claim:

1. In combination:
   a fishing pole including:
      an elongate rod including:
         a distal end;
         a proximal end; and
         a central section therebetween; and
      a reel attached to said rod central of said proximal end; and
   a fishing rod holder comprising:
      a sleeve for receiving said fishing rod; said sleeve including:
         a top end; and
         a bottom end;
      a base including:
         a front;
         a rear;
         a top; and
         a bottom; including
            a clamping surface;
      a pivot pivotally mounting said sleeve to said base such that said sleeve swings vertically between a downward stop position and an upright stop position;
      a biasing assembly connected to said sleeve and to said base including:
         a resilient tension member upwardly biasing said sleeve toward the upright stop position;
      a latch including:
         a first element connected to said base; and
         a second element connected to said sleeve; one said element including a pivoting member selectively engageable with the other said element and held in a latched position in engagement with the other said element by the upward biasing of said resilient tension member so as to hold said sleeve in a cocked position intermediate the downward stop position and the upright stop position; said pivoting member released from the latched position upon downward movement of said sleeve from said cocked position; and support attachment means attached to said base for selectively attaching a plurality of supports; and a plurality of supports attached to said base by said support attachment means; said supports including:
  a rigid clamping plate including:
    a top including:
      a clamping surface facing said clamping surface of said base; and
    means cooperating with said support attachment means for adjusting the distance between said clamping surface of said clamping plate and said clamping surface of said base;
  a jetty rod comprising:
    an elongate vertical rod including:
      an upper end including:
        a plurality of outwardly protruding stabilizing fingers; and
        means cooperating with said support attachment means for selectively attaching said jetty rod to said base; and
  an ice screw comprising:
    an elongate vertical rod including:
      a lower end including:
        screw means for screwing into ice; and
      means cooperating with said support attachment means for selectively attaching said ice screw to said base.

2. The combination of claim 1 further including:

tether means for selectively retaining a fishing pole in said sleeve.

3. A fishing rod holder comprising:

a sleeve for receiving a fishing rod; said sleeve including:
  a top end; and
  a bottom end;

a base including:
  a front;
  a rear;
  a top; and
  a bottom including:
    a clamping surface;

a pivot pivotally mounting said sleeve to said base such that said sleeve swings vertically between a downward stop position and an upright stop position;

a biasing assembly connected to said sleeve and to said base including:
  a resilient tension member upwardly biasing said sleeve toward the upright stop position;
  a latch including:
    a first element connected to said base; and
    a second element connected to said sleeve; one said element including a pivoting member selectively engageable with the other said element and held in a latched position in engagement with the other said element by the upward biasing of said resilient tension member so as to hold said sleeve in a cocked position intermediate the downward stop position and the upright stop position; said pivoting member released from the latched position upon downward movement of said sleeve from said cocked position; and a support clamp including:
  a distal threaded stud attached to said base and protruding downward distal from said clamping surface of said base;
  a proximal threaded stud attached to base and protruding downward intermediate said clamping surface and said distal stud;
  a rigid clamping plate including:
    bores therethrough receiving said studs;
    a top including:
      a clamping surface facing said clamping surface of said base; and
    a bottom;
  a space adjusting nut threadably attached to said proximal stud for bearing against said bottom of said clamping plate for adjusting the spacing of said clamping plate from said base at said proximal stud; and
  a clamping nut threadable attached to said distal stud for bearing against said top of said clamping plate.

4. The fishing rod holder of claim 3 further including:

tether means for selectively retaining a fishing pole in said sleeve.

\* \* \* \* \*